May 3, 1960 W. H. SUMMERER 2,935,288

CABINET SUPPORT

Filed April 19, 1956

INVENTOR.
William H. Summerer
BY
J. D. Douglas
His ATTORNEY.

United States Patent Office 2,935,288

Patented May 3, 1960

2,935,288

CABINET SUPPORT

William H. Summerer, Park Ridge, Ill., assignor to Admiral Corporation, Chicago, Ill.

Application April 19, 1956, Serial No. 579,196

4 Claims. (Cl. 248—349)

This invention relates to cabinet support means including supporting apparatus enabling a television receiver cabinet to be swung about a vertical axis provided by said apparatus.

Although mounting apparatus for pivotally supporting a television cabinet so that it may be swung about a vertical axis is not new to the cabinet mounting art, apparatuses for providing cabinets with this feature have been complicated and expensive of manufacture, since they frequently involved ball bearings of special construction, which were permanently attached to the cabinets.

Owing to the present invention, a television cabinet may be provided with a unitary support in which ball bearings are not needed and in which the number of parts that will enable a cabinet to be oriented about a vertical axis has been reduced with a consequent decrease in cost of manufacture of the mounting.

The novel cabinet support is particularly applicable to a metal television cabinet or cabinet having a metal bottom wall. Advantage is taken of a wall of this character to act as one of the elements of a bearing, while a second or supplementary, but more specialized, bearing element affords a stationary member to which the bottom wall is pivoted. Although the cabinet may be spaced from a horizontal support surface by a first set of feet, fixed to the bottom wall, the second element is also provided with a set of feet which space the first feet slightly from the support surface in which status the first feet operate to eliminate undue tipping of the cabinet by engaging the support surface.

Still other advantages of the invention, and the invention itself, will become more apparent from the following description of an embodiment thereof, which description is illustrated by the accompanying drawings, in which.

Figures 1, 3:
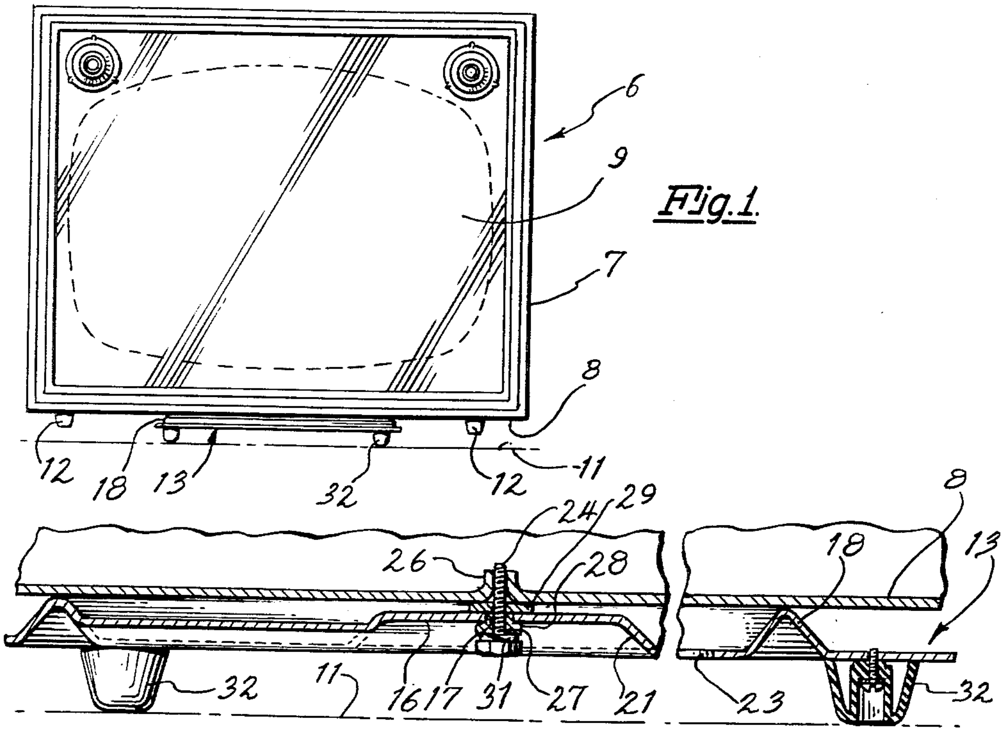
Fig. 1 is a front elevational view of a television cabinet in conjunction with which the invention is incorporated.
Fig. 3 is a vertical section taken on line 3—3 of Fig. 2.
Figure 2:
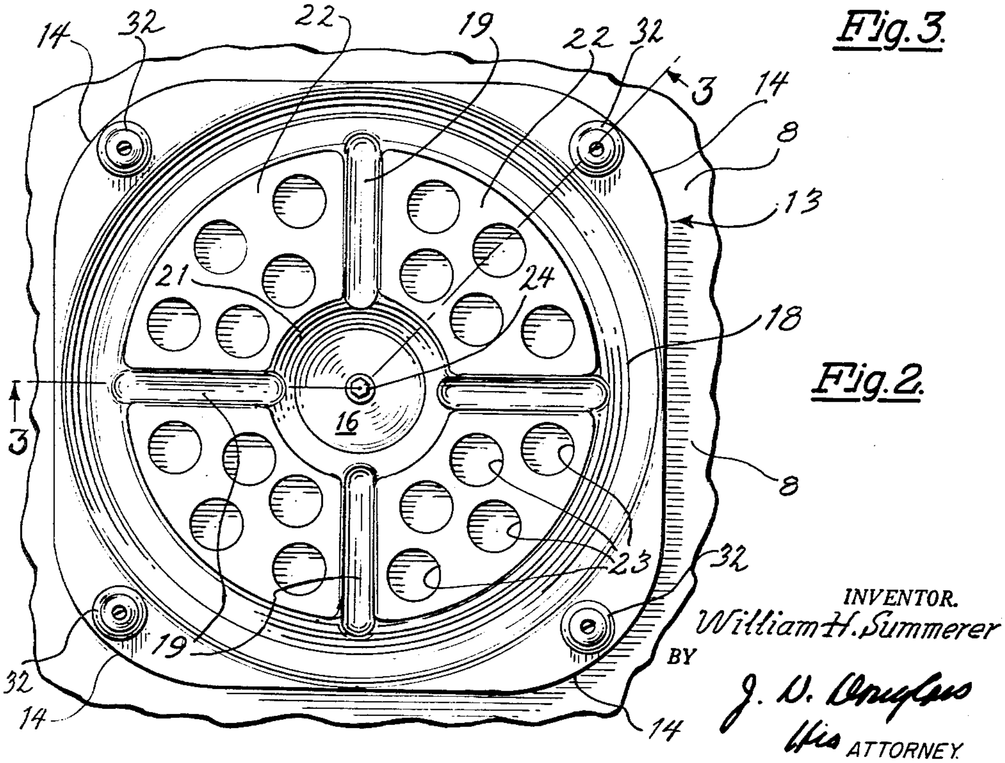
Fig. 2 is a bottom plan view of the mounting plate.

In the drawings the character 6 is used to denote a cabinet for housing television receiving apparatus and includes side walls 7, a bottom wall 8, and a window 9 through which a televised picture may be viewed. For its support above the level of a horizontal surface, such as afforded by a table top 11, the wall 8 bears a set of feet 12 which may be disposed at the opposite corners of the cabinet.

Supplementary and novel support is provided for the apparatus in order that its screen may be best viewed from different angles about the table top 11. This is carried out by a pivotal connection between the wall 8 and a horizontal bearing plate 13, later to be described in detail. For best practice of the invention, the wall 8 is of sheet metal and so affords one of the elements of a bearing, while the plate 13 forms the other bearing member.

The plate 13 is formed to be accommodated within the region about which the feet 12 are carried when the cabinet is swung. More specifically, the plate is metallic, preferably of sheet steel about 1/16 of an inch in thickness and substantially square in formation. Additionally, its corners are rounded as at 14. Centrally thereof, the plate 13 is offset upwardly to include a boss 16 at the center of which is an aperture 17. The aperture 17 is also axial to an annular bearing 18, also struck upward from the plate and of inverted V-shape in vertical section. The upper extremity of this portion provides a circular bearing portion which engages the bottom cabinet and is of reduced area thus supporting the cabinet and facilitating its rotation on the bearing surface. As a measure for adding rigidity to the plate 13, the same may be also formed with a plurality of radial ribs 19 extending between the bearing 18 and the walls 21 that slope from the offset wall 16. This leaves intermediate web portions 22, between adjacent ribs 19, each of which is additionally formed with a plurality of apertures 23 through which air may flow to enter the cabinet by also passing through apertures, not shown, in the bottom wall 8 to cool electronic apparatus within the cabinet.

The plate 13 is pivotally secured to the bottom wall 8 by means including a bolt 24 which is threaded in a boss 26 formed on the bottom wall 8 and passes freely through a bushing 27, in the aperture 17, the bushing having a flange 28 thereon. When the bolt 24 is tightened, a washer 29 thereon is clamped between the bushing 27 and bottom wall 8, while a lock washer 31, also on the bolt, is clamped between the flange 28 and bolt. The flange 28 is then spaced minutely more from the washer 29 than the thickness of the wall 16, so that both the bushing and washers are arranged to swing about their axis with the cabinet 6. As the cabinet is thus anchored to the plate 13, the bearing 18, throughout its upper perimeter, has bearing engagement with the bottom wall 8.

In the coupled relation between the plate 13 and cabinet 6, the feet 12 are spaced slightly from the horizontal surface 11. This is effected by a set of feet 32 at the corners of the plate. Preferably, the feet 32 are of some suitable vibration insulating material, such as rubber. Consequently, when turned about its pivot, as described, undue tipping of the cabinet, due to the elasticity of the feet 32, is precluded by the proximity of the feet 12 to the table top 11, which may be engaged by the feet 12.

It will be appreciated that the feet 12 on the cabinet extend below the plane defined by the bottom surface of the plate 13. Actually the feet 12 may extend further toward the table 11 if desired. In either event should it be desired the feet 32 may be removed, in which instance the cabinet would be supported by the feet 12 without removing the plate 13.

Although the invention has been described in an embodiment thereof, I am aware that extensive other departures may be made therefrom without deviating from the spirit or scope of the idea.

I claim:

1. In combination, a television receiver cabinet having a substantially flat bottom wall, and a support for the cabinet comprising a plate beneath the bottom wall of the cabinet, a pivot post extending up from said plate and threadedly connected to the bottom wall of the cabinet, said plate having an upwardly projecting inverted V-shaped rib which extends circularly about said pivot post and which engages the bottom wall of the cabinet, and said plate being spaced from the bottom wall of the cabinet throughout its extent away from said rib.

2. In combination, a television receiver cabinet having a substantially flat bottom wall, and a support for the cabinet comprising a sheet metal plate beneath the bottom wall of the cabinet, said plate having a central opening therein, an upstanding pivot post rotatably mounted in said opening and threadedly connected at its upper end to the bottom wall of the cabinet, said plate being formed with an integral upwardly struck annular hollow rib of inverted V-shaped cross-section which extends circularly about said opening and which engages the bottom wall of the cabinet, and said plate being spaced from the bottom wall of the cabinet throughout its extent away from said annular rib.

3. In combination, a television receiver cabinet having a substantially flat bottom wall, and a support for the cabinet comprising a sheet metal plate beneath the bottom wall of the cabinet, said plate having a central opening therein, an upstanding pivot post rotatably mounted in said opening and threadedly connected at its upper end to the bottom wall of the cabinet, said plate being formed with an integral upwardly struck annular hollow rib of inverted V-shaped cross-section which extends circularly about said opening and which engages the bottom wall of the cabinet, said plate being spaced from the bottom wall of the cabinet throughout its extent except at said annular rib, said plate being formed with a plurality of openings between said annular rib and said central opening for passing air up through the plate into the cabinet, and said plate being formed with a plurality of radially extending hollow strengthening ribs between its annular rib and its central opening.

4. The combination of claim 3, wherein said pivot post is in the form of a threaded bolt which is connected at its upper end to the bottom wall of the cabinet and at its lower end carries a transverse head disposed below the plate, and wherein there are provided a washer encircling the bolt and located between the plate and the bottom wall of the cabinet, and a flanged bushing loosely encircling the bolt and extending up through said central opening in the plate, said bushing having a flange disposed between said head on the bolt and the bottom of said plate, said head on the bolt forcing said bushing upward to position its flange in engagement with the bottom of the plate and its upper end in engagement with the washer to force the washer against the bottom wall of the cabinet so that the washer, flange and bolt turn in unison with the cabinet when the cabinet is turned with respect to said plate.

References Cited in the file of this patent

UNITED STATES PATENTS

| | | |
|---|---|---|
| 415,131 | Tousley | Nov. 12, 1889 |
| 547,926 | Kitson | Oct. 15, 1895 |
| 1,975,291 | Ritter | Oct. 2, 1934 |
| 1,978,695 | Clark | Oct. 30, 1934 |
| 2,074,564 | Scurlock | Mar. 23, 1937 |
| 2,091,394 | Park | Aug. 31, 1937 |
| 2,281,849 | McCoppin | May 5 1942 |
| 2,351,293 | Saunders | June 13, 1944 |
| 2,471,569 | Hay | May 31, 1949 |
| 2,723,763 | Baldwin | Nov. 15, 1955 |
| 2,779,642 | Matthews | Jan. 29, 1957 |